March 9, 1965 G. D'ARCY BROWNE 3,172,957
TIME DIVISION STEREOPHONIC SIGNAL TRANSMITTING AND REPRODUCING SYSTEM HAVING AN AUXILIARY THIRD CHANNEL
Filed Nov. 17, 1961 2 Sheets-Sheet 1

INVENTOR.
GEOFFREY D'ARCY BROWNE
BY Frank R. Jifani
AGENT

FIG. 4.
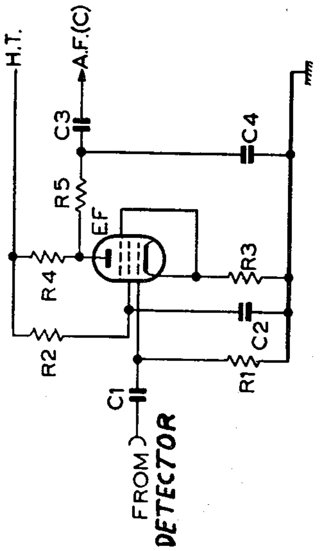
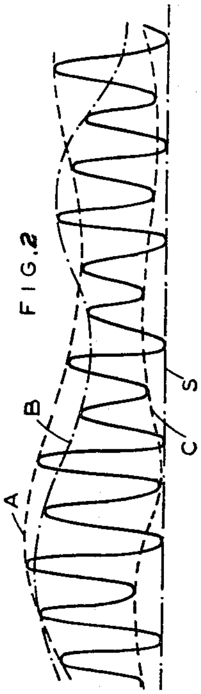
FIG. 3.
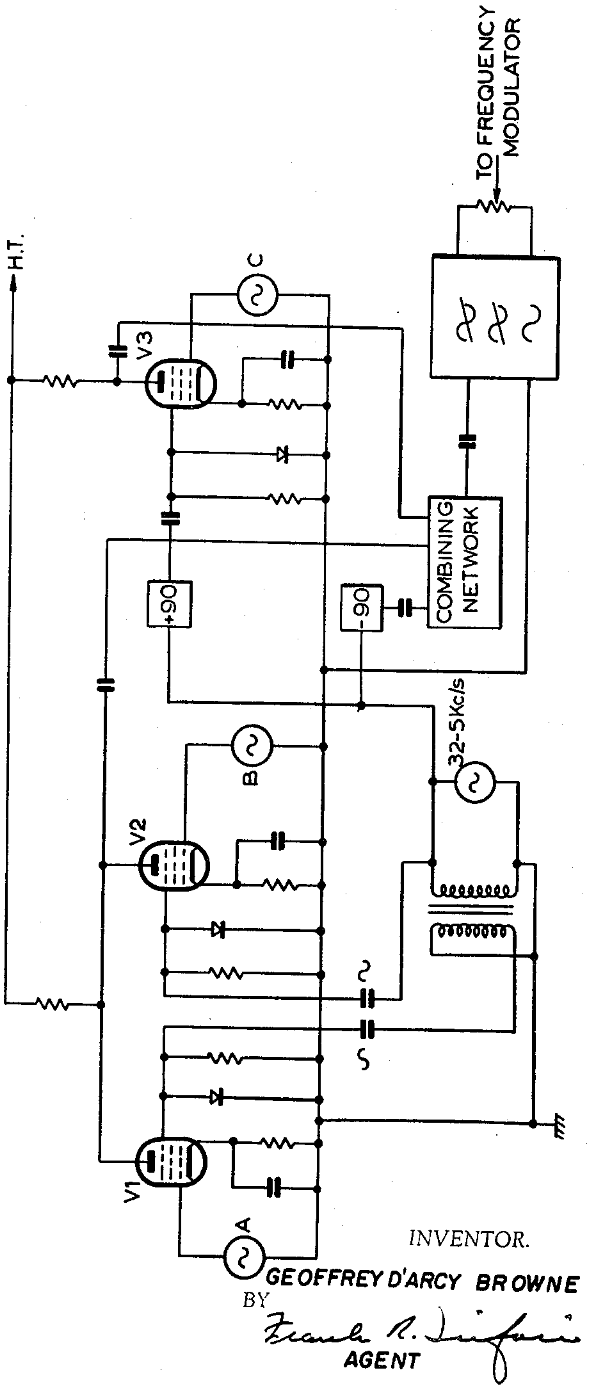
INVENTOR.
GEOFFREY D'ARCY BROWNE
BY
Frank R. Trifari
AGENT United States Patent Office 3,172,957
Patented Mar. 9, 1965

3,172,957

TIME DIVISION STEREOPHONIC SIGNAL TRANSMITTING AND REPRODUCING SYSTEM HAVING AN AUXILIARY THIRD CHANNEL

Geoffrey D'Arcy Browne, London, England, assignor to North American Philips Company, Inc., New York, N.Y., a corporation of Delaware Filed Nov. 17, 1961, Ser. No. 153,179
Claims priority, application Great Britain, Nov. 23, 1960, 40,356/60
5 Claims. (Cl. 179—15)

This invention relates to stereophonic signal transmitting and reproducing systems and, more particularly, to such a system as described and claimed in co-pending patent application Serial No. 13,850, filed March 9, 1960.

Briefly, the system described in said co-pending application comprises means for generating a time-interlaced pair of first gating waves, means for gating two identifiable stereophonically related audio signals alternately with said first gating waves for a time period less than one-half cycle of each gating wave thereby obtaining a coded wave having minima at a substantially uniform level, means for modifying said coded wave by displacing the level of alternate minima with respect to the level of the remaining minima, means for transmitting the complex waveform thus obtained, means for receiving said complex waveform, means for separating said alternate minima, means for deriving from said separated minima a second pair of gating waves having substantially the same phase as said first pair of gating means, means for supplying said second pair of gating waves to gating means, and means for supplying said complex signal to said gating means, said gating means acting to reconstitute said audio signals.

Sometimes it is required to transmit music and like signals continuously for reception by special receivers, for example, in a system known as the "storecast" system.

It is an object of the present invention to provide an improvement in the stereophonic system set forth above which allows of this facility.

According to the present invention, there is provided an improvement in the system described above for transmitting and receiving two identifiable stereophonically related audio signals including at the transmitting end means for modulating with respect to the said substantially uniform level the undisplaced alternate minima of the complex waveform with a further audio signal. The said further audio signal may be a pulsed signal used for signalling, control or like purposes but preferably it is a sound signal of the "storecast" type.

Means for deriving an audio waveform in accordance with the said further audio signal may be incorporated in the same receiver as that for deriving and reproducing the stereophonic signals or, alternatively, it may be incorporated in a separate monophonic receiver. A stereophonic receiver without the said additional means will, of course, derive the stereophonic signals transmitted by the system in the same manner described above, i.e., it will separate the alternate minima, derive from the separated minima a second pair of gating waves, supply said second pair of gating waves to gating means, and supply the complex signal to said gating means, the gating means acting to reconstitute the audio signal.

If the further audio signal is in the form of a varying D.C. signal which is positive with respect to the said substantially uniform level, the maximum depths of modulation of each audio signal must be such that each signal can still be positively identified, that is to say the minimum value of the peaks of the gating waves must be higher than the minima. If the further signal is in the form of a varying D.C. signal which is negative with respect to the said substantially uniform level, the maximum depth of modulation must be less than the depth to which the alternate minima for synchronization are displaced. Generally the further audio signal will be alternating with respect to the said substantially uniform level so that both requirements will have to be fulfilled, but the amplitude of the further audio signal may satisfactorily be very small so that little difference in the stereophonic performance of the system will be experienced.

In order that the invention may be readily understood, an embodiment thereof will now be described by way of example with reference to the accompanying drawings, in which:

FIGS. 1*a* and 1*b* are block diagrams of a transmitter and a receiver respectively for use in a system in accordance with the invention;

FIG. 2 shows the complex waveform to be transmitted and received as a frequency modulation of a carrier;

FIG. 3 shows a circuit arrangement for encoding the stereophonic signals and the further signal; and FIG. 4 shows a circuit arrangement for decoding the further audio signal.

Figure 1A:
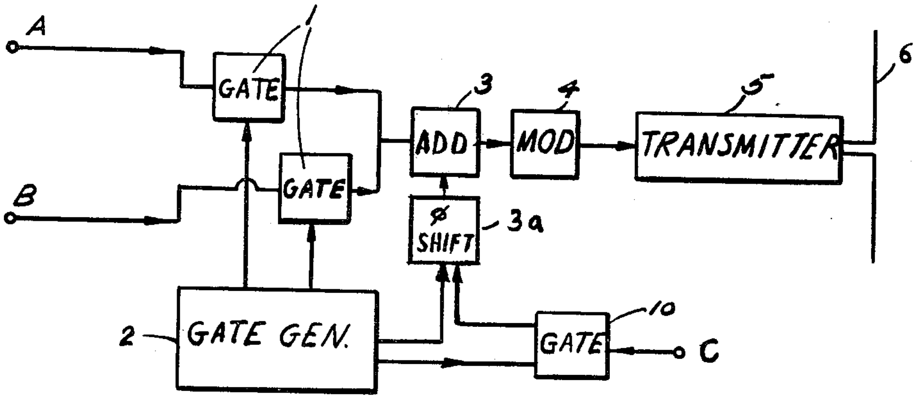

A transmitter for use with the system in accordance with the invention is shown in block schematic form in FIG. 1*a* and is in fact very similar to that shown in the aforesaid co-pending application with the addition of a further gating element 10, the adder 3 performing the function of combining or adding the various waveforms. In FIG. 1*a*, reference numeral 1 represents gating elements, numeral 2 represents a gating voltage generator which controls the gating elements 1 and 10, and numeral 3*a* represents a 90° phase shifter, the signals from which are combined in adder 3 with the signals from gates 1, the output of adder 3 being modulated via a modulator 4 on the carrier of the transmitter 5 and fed to the antenna 6. Two stereophonically related signals A and B are applied to gating elements 1 as shown and a third signal C is applied to gate 10.

The transmitter transmits a waveform of the type shown in FIG. 2 corresponding generally to the curve shown in FIG. 3*f* of said co-pending application, A representing the modulation envelope of a stereophonic signal A, B the modulation envelope of a stereophonic signal B, and S the level of the displaced alternate minima for synchronization. According to the present invention, the further audio signal having a waveform C is modulated on the undisplaced alternate minima which carried no information when the third signal C was not present. It will be seen from the curves that the depths of modulation of the various curves A, B, C and S must be such that curve C does not at any instant approach any of the curves A, B or S too closely otherwise their respective identities would be lost.

FIG. 3 shows one embodiment of a circuit diagram of a transmitter for encoding the signals A, B and C on a 32.5 kc./s. sub-carrier. The arrangement for encoding the signals A and B is the same as that of FIG. 2 of the co-pending application. Briefly, the sinusoidal voltage from the 32.5 kc. oscillation generator is converted by means of the transformer into two sinusoidal voltages, having a relative phase shift of 180° each being fed via a threshold device, formed by a respective diode as shown, to the collecting grid of a gating element V1, V2, respectively, consisting of a pentode. The two stereophonic signals A and B are fed to the control grids of tubes V1 and V2 respectively, so that a low frequency modulated gating voltage is obtained at the anode. A common anode resistor is shown for the two tubes. The minima carrying the synchronization information are obtained by applying a phase shift of −90° to the 32.5 kc. oscillation produced and adding this to the gated waveforms of A and B in the combining network shown schematically in the diagram. According to the present invention, a further audio signal C is modulated on the remaining minima by means of a further gating element comprising a tube V3. This tube is a short suppression grid-base pentode, as are tubes V1 and V2, and the circuitry and operation is similar to that of those tubes. The time at which the audio signal C is gated is determined by applying to the suppressor grid of V3 the 32.5 kc./s. sampling wave after it has been given a phase shift of +90°. The output of tube V3 is then applied to the combining network by means of a capacitor having a value of about 16 μf.

Figure 1B:
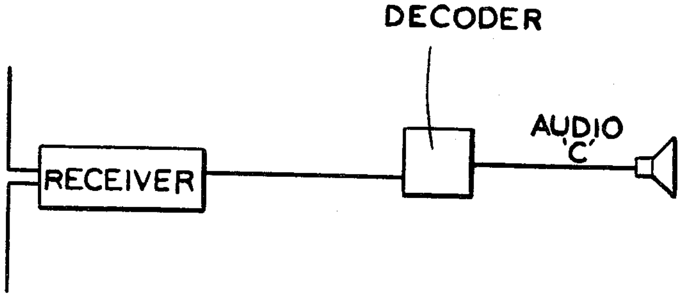

FIG. 1*b* shows a receiver which receives and detects the complex waveform received as a frequency modulation of the carrier and decodes and reproduces the audio signal C. The block labeled "receiver" is the portion of the circuit for deriving the stereophonically related signals A and B. This portion per se does not form part of the invention and is therefore not further described. It is shown in greater detail in FIGURES 1*b* and 4 of said copending application. After detection the complex waveform is applied to a decoder in order to derive the modulation corresponding to the audio signal C. A suitable decoder for this purpose is shown in FIG. 4. In this decoder the complex waveform is applied to the control grid of a tube EF with a phase such that the minima will appear as positive peaks. The tube, which is a sharp cut-off pentode, is biased so as to be cut off below a certain level of voltage at the control grid, whereby the negative peaks corresponding to the stereophonic signals A and B are not passed. The output from this tube is then passed to a network R5, C4 which performs the function of de-emphasizing the audio signal C and has a time constant such as to pass the audio signal C and not the gating wave frequency.

One practical set of components and values for this circuit arrangement of FIG. 4 is given, by way of illustration, in the table below:

*Table*

| | | | |
|---|---|---|---|
| R1 | 1M | C1 | .25 μf. |
| R2 | 2M | C2 | .1 μf. |
| R3 | 100 | C3 | .1 μf. |
| R4 | 5K | C4 | .003 μf. |
| R5 | 18K | Valve EF | Mullard Type EF 80 |

While particular embodiments of the invention have been shown and described, it should be understood that the invention is not limited thereto and it is intended that the appended claims are drawn to all such variations as fall within the spirit of the present invention. In particular, it is pointed out that the quantitative values given in the above description are for illustrative purposes only, to enable ready practice of the invention, and do not in any manner limit the scope thereof.

What is claimed is:

1. A system for transmitting and receiving two identifiable stereophonically related audio signals and a third audio signal comprising: means for generating a time-interlaced pair of first gating waves, means for gating said two audio signals alternately with said first gating waves for a time period less than one-half cycle of each gating wave thereby obtaining a coded wave having minima at a substantially uniform level, means for modifying said coded wave by displacing the level of alternate minima with respect to the level of the remaining minima, means for modulating with respect to said substantially uniform level the undisplaced alternate minima with the third audio signal, means for transmitting the complex waveform thus obtained, means for receiving said complex waveform, means for separating said alternate minima, means for deriving from said separated minima a second pair of gating waves having substantially the same phase as said first pair of gating waves, means for supplying said second pair of gating waves to gating means, means for supplying said complex signal to said gating means, said gating means reconstituting said two stereophonically related audio signals, and means for receiving and deriving from said complex waveform an audio waveform in accordance with said third audio signal.

2. A transmitting device for a system for the transmission of two coherent stereophonic signals and a third audio signal, said transmitting device comprising two transmitting channels fed by the coherent stereophonic signals and a third transmitting channel, a gating-voltage generator supplying a sinusoidal voltage, means for deriving a gating voltage from said sinusoidal voltage, said first and second channels being released alternately by said gating voltage thus producing a gated signal for the transmission of the coherent stereophonic signals by pulse amplitude modulation in time-interlaced periods, means for deriving a substantially sinusoidal synchronizing signal from the gating-voltage generator and phase shifting said signal about 90° with respect to the gating voltage, means for injecting said phase shifted synchronizing signal into the gated signal to be transmitted thus producing a gated signal synchronized at selected portions thereof, and modulating means for modulating said third audio signal on part of the unsynchronized portions of said synchronized gated signals.

3. A transmitting device as set forth in claim 2, wherein said gating voltage comprises two voltages having a phase shift of 180°, each of which is fed to a voltage limiter in order to obtain a gating voltage, and said modulating means includes means for deriving a substantially sinusoidal signal from the gating-voltage generator and second phase-shifting means for phase shifting said signal about 90°, said second phase shift being about 180° from the first phase shift, said second phase-shifted signal being applied to a third gating element to which is also applied said third audio signal, said third gating element modulating said third audio signal on said synchronized gated signal.

4. A receiver for receiving the synchronized gated signal transmitted by the transmitter of claim 2, comprising two separate receiving channels, connected to the output circuit of a time-interlacing device, said device releasing alternately the separate receiving channels in the same sequence of the gating voltage, the incoming signals being fed to a synchronizing signal selector consisting of the cascade connection of a threshold device and a resonant circuit tuned to the frequency of the synchronizing voltage, the output voltage of the synchronizing signal selector being fed, as a gating signal, to the time-interlacing device, and means for applying said incoming signals to a third channel, said third channel including means for deriving said third audio signal from said incoming signals.

5. A system for the transmission of stereophonic signals and a third audio signal including: a transmitter and at least one receiver, the transmitter comprising two transmitting channels fed by two coherent stereophonic signals A and B and a third transmitting channel fed by a third audio signal, first gating elements in each of said two transmitting channels, a gating-voltage generator supplying a sinusoidal voltage, means for applying a gating voltage to each of said first gating elements, said gating voltages being derived from said sinusoidal voltage with a relative phase shift for 180 degrees, said first gating elements operating to modulate the amplitude of said gating voltages with said stereophonic signals and to release said channels alternately in response to said gating voltages for the transmission of the coherent, stereophonic signals A and B by pulse amplitude modulation in time-interlaced periods, a receiver comprising two separate receiving channels connected to the output circuit of a time-interlacing device which alternately releases said separate receiving channels in synchronism with the alternate release of the transmitting channels, said transmitter including first and second 90-degree phase shifters acting to shift signals applied thereto 90 degrees in opposite directions, circuit means in said transmitter for applying said sinusoidal voltage to said first 90 degree phase shifter and deriving therefrom a substantially sinusoidal synchronizing signal shifted in phase through about 90 degrees with respect to the gating voltage, circuit means for injecting said synchronizing signal into the pulse sequence to be transmitted, a second gating element in said third transmitting channel, circuit means in said transmitter for applying said sinusoidal voltage to said second 90 degree phase shifter and deriving therefrom a gating signal, means for applying said gating signal to said second gating element and releasing said third transmitting channel in response to said gating signal, means for modulating the pulse sequence to be transmitted with the output of said second gating element, said receiver including a synchronizing signal selector to which the incoming signals are fed to restore the synchronizing signal, said selector comprising the cascade connection of a threshold device and a resonant circuit tuned to the frequency of the synchronizing voltage, the output voltage of the synchronizing signal selector being fed, as a gating signal, to said time-interlacing device, and means for demodulating the modulated transmitted signal and deriving the third audio signal therefrom.

References Cited by the Examiner

UNITED STATES PATENTS

| | | | |
|---|---|---|---|
| 2,262,764 | 11/41 | Hull | 179—15 |
| 3,013,147 | 12/61 | Guerth | 179—15 |
| 3,051,902 | 8/62 | Ross | 179—15 |

DAVID G. REDINBAUGH, *Primary Examiner.*